United States Patent [19]

Mobley

[11] Patent Number: 4,578,449

[45] Date of Patent: * Mar. 25, 1986

[54] TWO-STAGE PROCESS FOR PREPARATION OF POLYPHENYLENE OXIDES

[75] Inventor: David P. Mobley, Schenectady, N.Y.

[73] Assignee: General Electric Company, Schenectady, N.Y.

[*] Notice: The portion of the term of this patent subsequent to Oct. 16, 2001 has been disclaimed.

[21] Appl. No.: 705,812

[22] Filed: Feb. 26, 1985

Related U.S. Application Data

[63] Continuation-in-part of Ser. No. 659,045, Oct. 9, 1984, abandoned, which is a continuation-in-part of Ser. No. 479,066, Mar. 25, 1983, Pat. No. 4,477,649, and Ser. No. 609,075, May 10, 1984, abandoned.

[51] Int. Cl.$^4$ .................................................. C08G 65/44
[52] U.S. Cl. ...................................... 528/212; 526/65; 526/66; 526/67; 528/214; 528/215; 528/216; 528/217; 528/218
[58] Field of Search ............... 528/212, 214, 215, 216, 528/217, 218; 526/65-67

[56] References Cited

U.S. PATENT DOCUMENTS

| | | | |
|---|---|---|---|
| 3,306,874 | 2/1967 | Hay | 528/212 |
| 3,306,875 | 2/1967 | Hay | 528/212 |
| 3,789,054 | 1/1974 | Izawa et al. | 526/65 |
| 3,914,266 | 10/1975 | Hay | 528/212 |
| 3,988,297 | 10/1976 | Bennett et al. | 528/212 |
| 4,028,341 | 6/1977 | Hay | 528/212 |
| 4,054,553 | 10/1977 | Olander | 528/212 |
| 4,477,649 | 10/1984 | Mobley | 528/212 |

FOREIGN PATENT DOCUMENTS 7345600 1/1973 Japan.
8055996 8/1973 Japan.
7408597 11/1973 Japan.
8021798 8/1974 Japan.

*Primary Examiner*—Lester L. Lee
*Attorney, Agent, or Firm*—William H. Pittman; James C. Davis, Jr.; James Magee, Jr.

[57] ABSTRACT

Polyphenylene oxides are prepared by the catalytic reaction of oxygen with a monohydroxyaromatic compound such as 2,6-xylenol in a solvent for reactants and product, in a two-stage process. The first stage is effected continuously in at least one and preferably not more than two back-mixed (e.g., tank) reactors, and the second stage in one or more batch reactors or, preferably, in a reaction system with limited back-mixing, typically a cylindrical reactor containing multiple agitated zones. In the case of a copper catalyst system, it is also preferred to pre-mix the non-gaseous constituents of the reaction mixture in an inert atmosphere.

24 Claims, 3 Drawing Figures

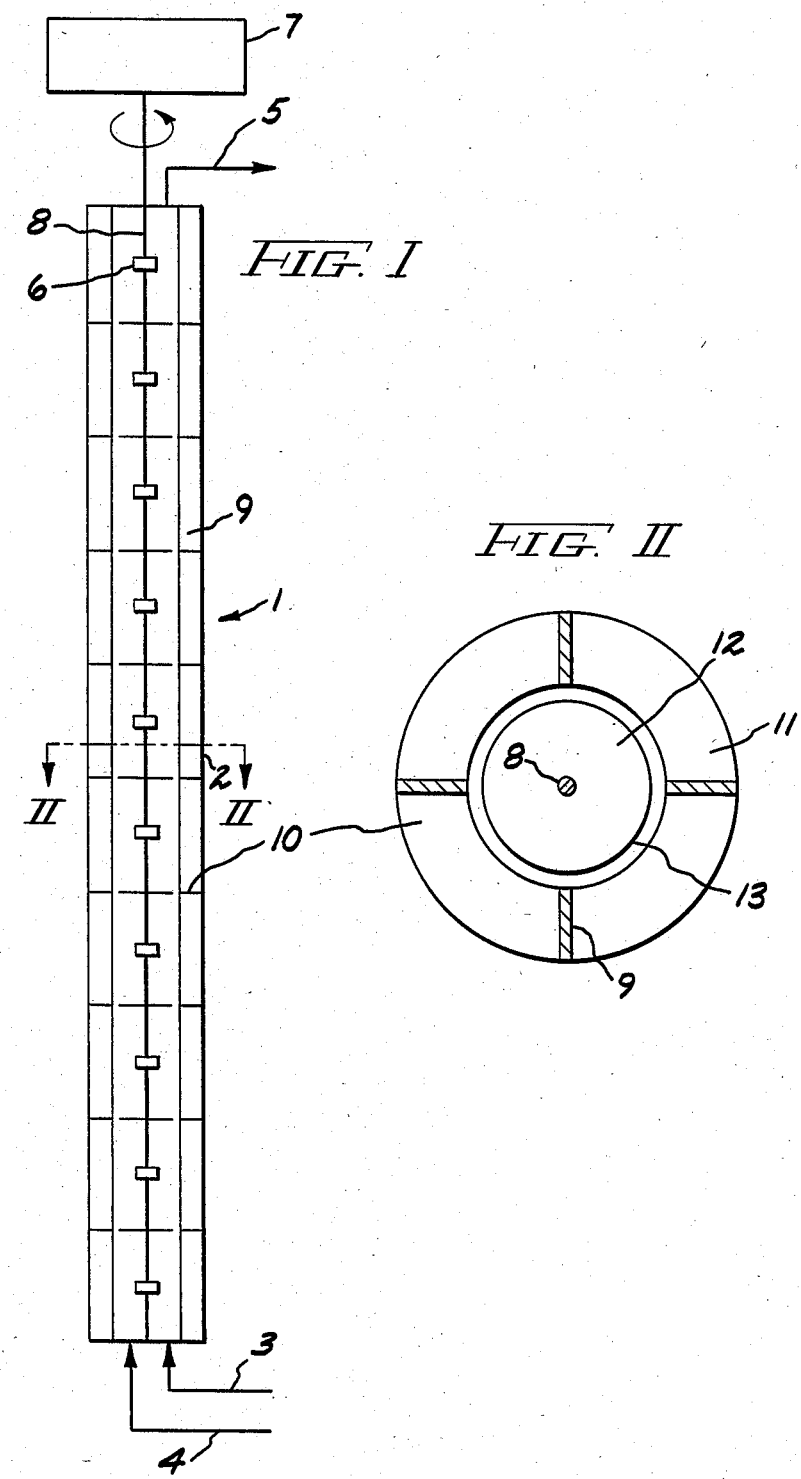

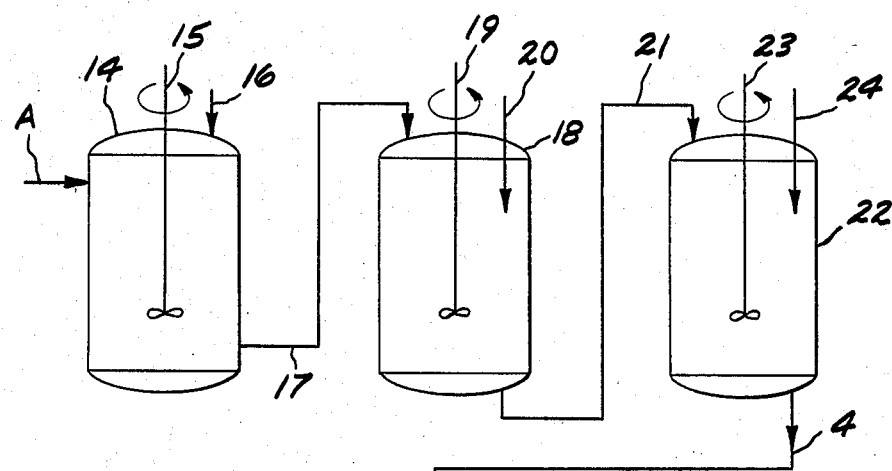
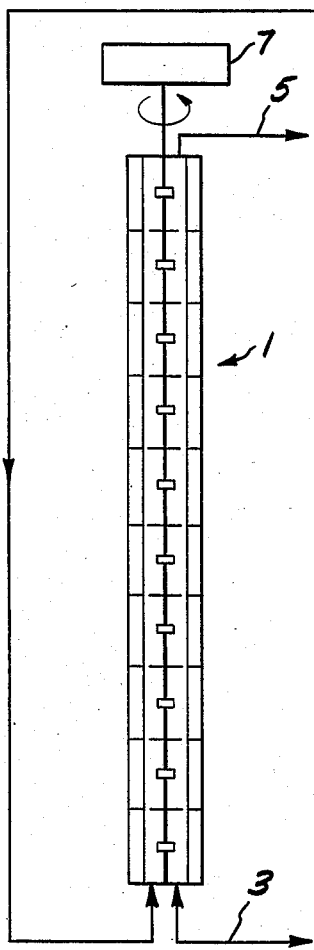
FIG. III

TWO-STAGE PROCESS FOR PREPARATION OF POLYPHENYLENE OXIDES

This application is a continuation-in-part of copending application Ser. No. 659,045, filed Oct. 9, 1984, now abandoned which in turn is a continuation-in-part of application Ser. No. 479,066, filed Mar. 25, 1983, now U.S. Pat. No. 4,477,649, and Ser. No. 609,075, filed May 10, 1984, now abandoned. The disclosures of all of said applications are incorporated by reference herein.

This invention relates to the preparation of polyphenylene oxides, and more particularly to a two-stage oxidative coupling process for such preparation which is adaptable to continuous operation.

For the most part, the present processes for the preparation of polyphenylene oxides (also known as polyphenylene ethers) are batch processes. Reference is made, for example, to the following U.S. patents:

U.S. Pat. No. 3,306,875 (hereinafter '875)
U.S. Pat. No. 3,914,266 (hereinafter '266)
U.S. Pat. No. 4,028,341 (hereinafter '341).

A problem associated with batch operation is variation from batch to batch in product quality. In addition, continuous processes frequently offer lower capital and operating costs per unit of production than batch processes, especially in large-scale production.

There have been disclosed various processes possibly adaptable to continuous production of polyphenylene oxides. For example, U.S. Pat. No. 3,306,874 (hereinafter '874) and Japanese Kokai No. 80/21798 (published application No. 80/40613) disclose polymerization processes using three reactors in series. A similar process using two reactors is disclosed in Japanese Kokai No. 73/45600. Three different kinds of column reactors are disclosed in Japanese Kokai No. 74/08597, Japanese Kokai No. 80/55996 and Czechoslovakian Patent No. 192,278. These reaction systems suffer from various disadvantages including a relatively high catalyst level and an unduly long residence time in one or more reactors.

A principal object of the present invention, therefore, is to provide an improved process for the preparation of polyphenylene oxides.

A further object is to provide such a process which is conveniently adapted to continuous production on a commercial scale.

Still another object is to provide such a process which, when operated continuously, affords improvements over previously disclosed continuous processes, including lower catalyst level and lower overall residence time in the reaction system.

Other objects will in part be obvious and will in part appear hereinafter.

In its broadest sense, the present invention is an improvement in an oxidative coupling process for preparing polyphenylene oxides by the catalytic reaction of oxygen with at least one monohydroxyaromatic compound in solution in a solvent in which said polyphenylene oxide is also soluble, said improvement comprising carrying out said reaction in two stages, the first stage being conducted continuously in at least one back-mixed reactor and the second stage in at least one batch reactor or continuously in a reaction system with limited back-mixing.

The invention, while not limited to any particular theory, is based on a number of discoveries about the nature of the oxidative coupling reaction leading to the polyphenylene oxide. In the first place, said reaction in its early stages (i.e., up to about 90% conversion) is essentially zero order; that is, its rate is essentially independent of reactant concentration. Moreover, in early stages a high concentration of monohydroxyaromatic compound can promote formation of by-products such as tetramethyldiphenoquinone. In later stages, however, the reaction is first order with respect to concentration of the hydroxy group. At that point, of course, said concentration is relatively low, since a large proportion of the available hydroxy groups have been converted to ether groups. Therefore, the reaction is quite slow in these later stages.

In the second place, the oxidative coupling polymerization is essentially an equilibrium reaction. Therefore, if both high molecular weight and low molecular weight polymer are present a leveling effect occurs and the resulting mixture assumes an intermediate molecular weight. It is therefore desirable to segregate monohydroxyaromatic reactant and low molecular weight polymer from high molecular weight product. Under such conditions, the reaction kinetics provide a high molecular weight product with the use of less catalyst, a lower residence time and less oxygen.

The invention takes advantage of these conditions by conducting the first stage of the reaction in one or more back-mixed reactors, wherein polymerization is relatively rapid and as a result the monohydroxyaromatic compound concentration is low enough to minimize by-product formation. The second stage is conducted in a system which segregates higher molecular weight product, in which hydroxy group concentration is low, from the lower molecular weight material in which it is higher. This segregation may be spacewise as in a continuous limited back-mixing reactor, or timewise as in one or more batch reactors. The result is an increase in the overall rate of polymerization, both because of the first-order nature of the reaction and because it is an equilibrium reaction.

Typical monohydroxyaromatic compounds (hereinafter sometimes referred to as "phenols" for brevity) useful in the process of this invention are those having the formula

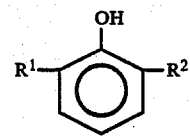

where $R^1$ is a lower primary alkyl group and $R^2$ is a lower primary or secondary alkyl group, the word "lower" meaning that it contains up to 7 carbon atoms. Examples of lower primary alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of lower secondary alkyl groups are isopropyl, sec-butyl and 3-pentyl. Preferably, $R^1$ and $R^2$ are straight chain rather than branched. Since the polyphenylene oxides in which $R^1$ and $R^2$ are other than methyl generally have no more desirable properties than those in which $R^1$ and $R^2$ are both methyl, and since 2,6-xylenol is the most readily available and cheapest 2,6-dialkylphenol, its use is preferred. The polyphenylene oxide obtained is then poly(2,6-dimethyl-1,4-phenylene oxide). Other suitable phenols are disclosed in the '874, '875 and '341 patents, the disclosures of which are incorporated by reference herein.

Various catalyst systems have been disclosed for the preparation of polyphenylene oxides, and any of them can be used in the process of this invention. For the most part, they contain at least one heavy metal compound such as a copper, manganese or cobalt compound, usually in combination with various other materials.

A first class of preferred catalyst systems consist of those containing copper. They are usually combinations of cuprous or cupric ions, halide (i.e., chloride, bromide or iodide) ions and at least one amine.

The source of copper can be any of the cupric or cuprous salts disclosed in the '874 and '875 patents. See, for example, '874 from column 3, line 62, to column 4, line 61. The halide ion is preferably bromide, and its source can be any of those disclosed in the '341 patent; particular reference is made to column 8, line 61, to column 9, line 53. For example, it can be an inorganic bromide (except for ammonium bromide, because the ammonium ion can also form a strong complex with copper ions) and can include bromine and hydrogen bromide. Also useful are organic bromine compounds which, under reaction conditions, produce bromide ions. An example thereof is 4-bromo-2,6-xylenol. The only basic requirement is that the bromine compound be capable of supplying a form of bromide ion which is soluble in the reaction mixture. If the bromine compound itself is insoluble, it can still be satisfactory if it forms soluble complexes with the amine constituents of the catalyst or produces a soluble product under oxidative coupling conditions. When metal bromides other than the copper bromides are used, the particular metal used is merely one of choice. Since some of these materials (e.g., cobalt) form complexes with amines, suitable adjustments in the amount of amine used may sometimes be necessary. Because of low cost and ready availability, when using a metal bromide often the alkali or alkaline earth metal bromides are used, e.g., sodium bromide. Since hydrogen bromide will react with amines to form an amine hydrobromide salt and bromine will brominate the phenol and simultaneously produce hydrogen bromide, again adjustments in the amount of amine may be necessary in such situations.

The currently preferred bromide source is HBr, which may conveniently be combined with the copper source as a solution of cuprous oxide in aqueous hydrobromic acid.

The amine constituents of the copper catalyst system may be any of those disclosed in the '874, '875, '266 and '341 patents. Preferably, however, the amines comprise at least one secondary alkylene diamine and at least one tertiary monoamine.

The secondary alkylene diamine may be selected from those disclosed in the '341 patent, especially from column 6, line 44, to column 8, line 11. It generally has the formula

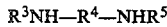

$$R^3NH\text{---}R^4\text{---}NHR^5$$

wherein each of $R^3$ and $R^5$ is a secondary or tertiary alkyl group and $R^4$ is a divalent hydrocarbon group, and wherein at least two and no more than three carbon atoms separate the two amino nitrogen atoms and the carbon atoms to which the amino nitrogens are attached are aliphatic. Preferably, there are only two carbon atoms separating the two amino nitrogens. The two or three carbon atoms separating the amino nitrogens can be either acyclic or cyclic carbon atoms. Typical examples of $R^4$ include ethylene, 1,2- and 1,3-propylene, 1,2-, 1,3- and 2,3-butylene, the various pentylene isomers having from two or three carbon atoms separating the two free valences, phenylethylene, tolylethylene, 2-phenyl-1,2-propylene, cyclohexylethylene, 1,2- or 1,3-cyclohexylene, 1,2-cyclopropylene, 1,2-cyclobutylene and 1,2-cyclopentylene.

Typical examples of $R^3$ and $R^5$ include isopropyl and tertiary alkyl (e.g., t-butyl) groups. The substituents on the α-carbon atoms can be straight or branched chain alkyl, cycloalkyl, aryl or alkaryl. Other examples include those set forth in the '341 patent, column 8, lines 2–11, e.g., 2-methyl-2-butyl, etc. The currently preferred secondary alkylene diamine is N,N'-di-t-butylethylenediamine.

The tertiary monoamine can be selected from those disclosed in the '341 patent; specific reference should be made to column 8, lines 12–33. It can be a heterocyclic amine or a trialkylamine characterized by having the amine nitrogen attached to at least two groups which have a small cross-sectional area. In the case of a trialkylamine, it is preferred that at least two of the alkyl groups be methyl with the third being a $C_{1\text{-}8}$ primary or $C_{3\text{-}8}$ secondary alkyl, and it is more preferred that the third substituent have no more than four carbon atoms. The currently preferred tertiary monoamine is dimethyl-n-butylamine.

At least one secondary monoamine as disclosed in the '874 patent from column 4, line 62 to column 6, line 13 may optionally also be used. In addition to functioning as part of the catalyst and increasing the activity thereof, the secondary amine frequently becomes chemically bonded to the polymer, at least in part, and increases the impact strength thereof, particularly in blends with other polymers such as polystyrenes. It is believed that the increase in impact is achieved by a crosslinking reaction similar to that disclosed in U.S. Pat. No. 4,054,553 at column 6, lines 28–60. The currently preferred secondary monoamines are dimethylamine and di-n-butylamine. The use of dimethylamine for this purpose in polyphenylene oxide preparation is disclosed and claimed in copending, commonly assigned application Ser. No. 501,477, filed June 6, 1983.

It is within the scope of the invention to use copper catalyst systems containing complex salts such as copper(I)-(N,N-di-t-butylethylenediamine) 2,6-xylenoxide, as disclosed and claimed in copending, commonly assigned application Ser. No. 572,036, filed Jan. 19, 1984.

Manganese-containing systems constitute a second preferred class of catalysts. They are generally alkaline systems containing divalent manganese and such anions as halide, alkoxide or phenoxide. Most often, the manganese is present as a complex with one or more complexing and/or chelating agents such as dialkylamines, alkanolamines, alkylenediamines, o-hydroxy aromatic aldehydes, o-hydroxyazo compounds, ω-hydroxyoximes (monomeric and polymeric), o-hydroxyaryl oximes and β-diketones. As in the copper-containing systems, secondary amines such as dialkylamines frequently become chemically bound to the polyphenylene oxide product and increase its impact strength.

The following patents are incorporated by reference herein for their disclosures of manganese-containing catalyst systems:

| | | |
|---|---|---|
| 3,956,242 | 4,075,174 | 4,110,312 |
| 3,962,181 | 4,083,828 | 4,184,034 |
| 3,965,069 | 4,093,596 | 4,315,086 |
| 3,972,851 | 4,093,597 | 4,335,233 |
| 4,054,553 | 4,093,598 | 4,385,168. |
| 4,058,504 | 4,102,865 | |

Also useful in the method of this invention are cobalt-containing catalyst systems such as those disclosed in U.S. Pat. Nos. 3,455,880 and 4,058,504, the disclosures of which are also incorporated by reference herein.

A phase transfer catalyst may optionally be used in the reaction system as a reaction rate promoter. Useful phase transfer catalysts are disclosed in U.S. Pat. No. 3,988,297, hereby incorporated by reference; specific reference is made to column 2, lines 11–26, and column 3, lines 1–23. The currently preferred phase transfer catalyst (especially for copper-containing systems) is Adogen 464, which is a methyltrialkylammonium chloride wherein the alkyl groups have from 8 to 10 carbon atoms.

The presence of one or more solvents for reactants, catalyst and polyphenylene oxide product is an essential feature of the invention. Typical solvents for copper-containing systems are disclosed in the '874, '875 and '341 patents. Illustrative solvents for this purpose are toluene and benzene; other inexpensive and readily available commercial solvents may also be used. For manganese systems, solvents of the same type may be used in combination with minor amounts (usually about 5–10% by weight) of lower alkanols (preferably methanol) or the like which maintain the manganese compounds in solution.

According to the present invention, the oxidative coupling reaction producing the polyphenylene oxide is carried out in two stages. The first stage is effected continuously in at least one back-mixed reactor. Back-mixed reactors include tank and certain types of loop reactors. Particularly preferred are continuous-flow stirred tank reactors (hereinafter "CSTR's"), which are known to be back-mixed reactors; reference is made to Perry, *Chemical Engineers' Handbook*, Fourth Edition, p. 19-11 (FIG. 19-22), and Levenspiel, *Chemical Reaction Engineering*, Second Edition, p. 98 (FIG. 1c). Because of this preference, CSTR's are frequently referred to hereinafter, but it should be understood that other back-mixed reactors may be substituted therefor when appropriate. It is also within the scope of the invention to use two CSTR's in series, but the use of more than two offers little or no advantage. Reference hereinafter simply to a "CSTR" will denote the first or only such vessel, with "second CSTR" denoting the optional second such vessel.

Reaction is initiated in the CSTR with oxygen being sparged into the same and sufficient agitation being provided to ensure efficient gas-liquid contact. Any suitable agitation means can be used, e.g., a flat-bladed turbine agitator. The object at the beginning of a run is to achieve steady state conditions as soon as possible. This may be accomplished by means known in the art. For example, the reaction may be run batchwise until a high conversion level is reached and then continuously.

The heat of reaction is usually removed from the CSTR to maintain a constant temperature in the range of about 10°–60° C., usually 20°–55° C. and preferably 30°–35° C. This can be accomplished in conventional manner, e.g., reaction solution can be circulated from the CSTR through external heat exchangers where heat is removed by a cooling fluid, or cooling coils internal to the CSTR or an external cooling jacket can be used. The outlet stream from the CSTR is fed either to a second CSTR or to the second stage reactor(s).

The residence time in the CSTR will generally be from about ten minutes to two hours, preferably 20–60 minutes and most preferably about 30 minutes.

The pressure in the CSTR is typically atmospheric with oxygen being sparged thereinto at one atmosphere. If desired, the oxygen can be diluted with inert gases or air can be used, but the use of pure oxygen is preferred. Subor superatmospheric pressures can be used but are seldom if ever necessary.

The amount of oxygen is generally at least the stoichiometric amount needed to react with the phenol to achieve the desired level of conversion. Amounts substantially in excess of stoichiometric can be used, of course; for example, at a 70% molar excess of oxygen the interfacial area between the gas and liquid phase is increased. However, it is generally found that if high agitation is used so much oxygen is not required; e.g., at 10% molar excess of oxygen the reaction readily proceeds to the desired degree of conversion.

Usually, at least about 65% of the hydroxyl groups in the phenol are converted to ether linkages in the CSTR, most desirably about 90% conversion being achieved. At conversions much less than about 65%, an increased conversion level will be required in the later stages of the process; this is not desirable because it is then difficult to attain higher molecular weights.

Because of the nature of the polymerization, a large proportion of the total conversion, and thus a large proportion of the total heat release, can take place in the CSTR without forming polymer of high molecular weight. Thus, per the process of the present invention the majority of heat release takes place under a condition which is conducive to efficient heat transfer, i.e., low solution viscosity, typically on the order of less than about 10 cps. Of course, as the percent conversion increases, viscosity increases because of the increasing molecular weight of the polymers formed in the system. If necessary at this or other points in the process, additional solvent may be added to decrease solution viscosity.

After the desired degree of conversion is reached, water may be removed from the reaction mixture by centrifugation, decantation or equivalent means. Water removal is optional but may be desirable, since water may cause partial catalyst deactivation. The mixture then passes either to a second CSTR or to the limited back-mixing reactor.

The pressure of operation, temperature of operation and degree of agitation in the second CSTR (if used) are essentially the same as those used in the first CSTR. Somewhat less oxygen is necessary, however, since the conversion therein is lower than the first CSTR. The residence time in the second CSTR is typically about 20–90 minutes, preferably 30–50 minutes and most preferably about 30 minutes. Water removal after the second CSTR is also an optional but frequently preferred step.

In the first CSTR, the primary effect desired is to achieve a high percentage of the total conversion; in the second stage reaction system, it is to increase molecular weight. In the second CSTR, when used, an intermediate effect is achieved, i.e., increasing percent conversion, though not as much as in the first CSTR, and increasing molecular weight, though not as much as in the second stage reaction system.

While cooling is generally necessary in the first CSTR because of the high percent conversion, as consequence of lower percent conversions is the second CSTR, heat removal may not be necessary in some instances. Solution viscosity does somewhat increase in the second CSTR, but the solution has a relatively low viscosity, in most instances probably no more than about 20 cps.

The conversion level of the product is typically increased no more than about 5-30% in the second CSTR. However, since there is a relatively high percent conversion in the first CSTR, in the second CSTR one can essentially increase weight average molecular weight in the product severalfold, typically at least fivefold.

The second stage of the process of this invention is effected either in at least one batch reactor or continuously in a reaction system with limited back-mixing; that is, one which approaches plug flow. The term "plug flow" is defined in Levenspiel, op. cit., p. 97, as follows:

It is characterized by the fact that the flow of fluid through the reactor is orderly with no element of fluid overtaking or mixing with any other element ahead or behind. Actually, there may be lateral mixing of fluid in a plug flow reactor; however, there must be no mixing or diffusion along the flow path.

Thus, "limited back-mixing" in the present context means that there is little or, ideally, no mixing of high molecular weight with lower molecular weight polyphenylene oxide. Limited back-mixing reaction systems are typified by continuous-flow tubular reactors, especially those in which baffles, packing, multiple reaction zones or the like are present to minimize flow in the reverse direction.

At first glance, it may appear that there is little or no similarity between the two kinds of second stage reactors which may be employed. Those skilled in the art will, however, recognize the similarities between batch reactors and limited back-mixing continuous reactors. A specific element of fluid is ideally homogeneous in either type of reactor with respect to degree of completion of the reaction. In a batch reactor, said element is the entire contents of the reactor and the progress of the reaction is orderly in relation to time. In a limited back-mixing reactor, each element passing through is in an orderly state of progress in relation to space. The overall result is the same irrespective of which reaction system is used.

When batch reactors are employed in the second stage, it may be advisable to interrupt the polymerization reaction until an entire batch has been charged to a reactor. This may be done by interrupting oxygen flow or, when necessary, by introducing an inert gas such as nitrogen. It is preferred to keep the interruption time as short as possible in order to maintain maximum catalyst activity, particularly when a manganese catalyst system is employed.

In a batch reactor system it is generally preferred to use a plurality of such reactors, charging the feed from the CSTR thereto in succession for maximum efficiency. It is also within the scope of the invention to utilize the CSTR as a batch reactor at some point by shutting off its feed and outlet streams.

Preferably, the second stage reaction system consists of a limited back-mixing reactor. A typical reactor of this type is divided into multiple reaction zones by horizontal baffles which restrict the flow of fluid from one stage to a preceding zone. Such a reactor is frequently referred to hereinafter as a "multi-zone reactor". One skilled in the art will recognize that the degree of back-mixing in such a reactor can be controlled by such design variables as the number of zones and the cross-sectional area of the horizontal baffles with respect to the cross-sectional area of the column. Typically the multi-zone reactor is an upright cylindrical vessel. Oxygen is sparged into the multi-zone reactor and each stage is agitated to provide efficient gas-liquid mixing, typically by turbine agitators. However, other agitation methods can be used such as reciprocating plate agitators and the like. While co-current flow of liquid feed stream and oxygen is typically employed, countercurrent flow is also possible.

The number of zones in the multi-zone reactor will obviously be greater than one, since one stage would be equivalent to a CSTR. As one skilled in the art will appreciate, more zones provide more limited back-mixing. It is currently believed that at least two zones will be necessary to achieve any significant limitation of back-mixing, and at least five zones are preferred. The number of zones will generally be set by process economics since increasing the number of zones will increase the cost of the reactor. Practically speaking, a reactor with more than 50 zones is unlikely, and usually about 5-20 zones are acceptable.

It is also possible to use, in place of a multi-zone reactor, any of various other reactors which provide limited back-mixing. For example, a tubular reactor containing static mixer elements can be used. Another alternative is a multi-tray gas-liquid contactor, which has essentially the same design as a sieve-tray distillation column. Still another is a packed bed reactor, which promotes a high gas-liquid interfacial area and a good dispersion of the gas and liquid phases without the necessity for introduction of energy to effect agitation. Other types of limited back-mixing reactors will be apparent to those skilled in the art.

As earlier indicated, the main effect desired in the second stage reaction system is to increase molecular weight; for example, the reaction solution entering said system may have a weight average molecular weight on the order of less than 5000, which may be increased therein to 75,000 or more. Conversion, is, of course, substantially less than in the CSTR's. Typically a 50,000 weight average molecular weight will be obtained at greater than 99 percent conversion.

In a manner similar to the CSTR's, agitation is provided in the second stage reaction system so as to ensure good gas-liquid contact between the reaction solution and oxygen being sparged therein. The oxygen flow rate is at least stoichiometric for the conversion, and is generally at least two times stoichiometric to assist in increasing the gas-liquid interfacial area. It does not appear that a flow rate as high as five times stoichiometric substantially assists the reaction and, as will be apparent to one skilled in the art, the use of too high a flow rate could lead to stripping of solvent or liquid catalyst ingredients and, of course, wasting oxygen.

The pressure in the second stage reaction system is essentially the same as in the CSTR's, i.e., essentially atmospheric, but sub- and superatmospheric pressures are not excluded.

The temperature is typically on the order of about 20°–60° C., preferably 30°–40° C. Cooling and heating of the reactor(s) can be accomplished in the manner as discussed for the CSTR's, i.e., external jackets, internal coils, etc. It is also possible to cool and/or heat various zones differently. For example, it may sometimes be advantageous to cool the initial zones of a multi-zone reactor to remove heat of reaction while heating later zones to decrease solution viscosity.

The average liquid residence time in the second stage reaction system is about 5–90 minutes, preferably 10–40 minutes. Exceedingly low residence times are insufficient for the desired increase in molecular weight, and at exceedingly high residence times catalyst deactivation is encountered.

When a copper catalyst system is employed, it is frequently preferred to pre-mix the non-gaseous constituents (i.e., phenol, components of the catalyst, solvent and phase transfer catalyst when used) in an inert (e.g., nitrogen or helium) atmosphere to form a homogeneous mixture which is fed to the first stage. This pre-mixing step in its more general application is disclosed and claimed in copending, commonly assigned application Ser. No. 479,057, filed Mar. 25, 1983. It is believed that the ingredients of the copper catalyst system interact with each other more efficiently in the absence of oxidant (i.e., oxygen) and in the presence of a high concentration of phenol, resulting in higher conversion and a decrease in amount of catalyst required when a pre-mixing stage in an inert atmosphere is employed. Thus, such a stage promotes formation of the actual catalyst species under extremely favorable conditions. Inert pre-mixing is generally neither required nor suitable when a manganese catalyst system is employed, since maximum catalyst activity in such systems is attained by adding the manganese reagent to a phenol-oxygen mixture and maintaining it in continuous contact with oxygen to the extent possible.

Pre-mixing may be effected in a batch or continuous operation. When it is a batch operation, the copper and halide ions should be added last in order that they will be solubilized by complex formation with the amines. It is within the scope of the invention to pre-mix and store a large catalyst batch, using it as required in the polymerization process.

Continuous pre-mixing operations may be conducted by in-line blending (i.e., with no pre-mixing vessel) or may utilize a vessel for the pre-mix step. In the former case, the order of mixing should be as previously described. In the latter, no special addition order is necessary since each catalyst ingredient is always present in said vessel. Under these conditions, a catalyst species is formed which is highly active under oxidative coupling conditions and which retains high activity for a relatively long period of time, thus continuing to promote effective polymerization for the duration of the polymerization process.

The polyphenylene oxides produced by the process of this invention typically have weight average molecular weights of about 5,000 to 75,000, corresponding to intrinsic viscosities of about 0.1–0.75 dl./g. as determined in chloroform at 25° C. The molecular weight is preferably above about 50,000. The percent product in the final reaction solution is obviously determined by the amount of phenol introduced, since essentially all of said phenol is converted to polymer per the present invention. The product polymer may be isolated from solution by conventional methods such as precipitation by addition of a non-solvent for the polymer.

One unique benefit of the process of the present invention is its high flexibility with respect to the use of various proportions of materials, enabling one to prepare polyphenylene oxides of varying molecular weights with flexibility. However, as with all processes, there are certain preferred proportions which are now discussed.

The phenol is generally used in an amount of about 5–60% of total solution weight, preferably 10–40% and most preferably 15–25%. Products which have a commercially desirable molecular weight are most easily obtained in the area of 20% phenol.

Metal (e.g., copper or manganese) ratios are generally 1 mole of metal to about 100–1500 and preferably 250–1000 moles of phenol. In the case of a copper system, the molar ratio of halide (preferably bromide) to copper ions in the catalyst affects catalyst activity, and a ratio of at least about 3.5 moles halide to 1 mole copper is preferred. The upper limit of this ratio is not critical and molar ratios as high as 6 or 12 or more can be used. Currently preferred molar ratios are 4–6 moles Br per mole Cu. The secondary alkylene diamine is generally used in an amount of about 0.4–3 moles, and the tertiary monoamine in an amount of about 10–100 moles and preferably 20–60 moles, per mole of copper.

The molar ratio of phenol to alkali (usually sodium hydroxide or potassium hydroxide) in a manganese system is usually about 5–40:1. It is most often about 10–20:1, and preferably about 14–18:1 when the phenol is 2,6-xylenol.

The secondary monoamine, when present, is generally used in an amount up to 3 mole percent based on phenol, with 0.5–2 mole percent being preferred. The phase transfer agent, when present, is typically used in an amount of up to 0.8%, preferably 0.1–0.2%, by weight based on phenol.

It is within the scope of the invention to introduce all of each reagent at the beginning of the system, or to introduce various reagents incrementally at various points in the system. For example, when a pre-mixing stage is employed the entire amount of phenol may be introduced into said pre-mixing stage, or a portion thereof (typically about 20–50% of the total amount) may be added at a later stage, most often into the first reaction vessel. The same is true of the catalyst ingredients, although replenishment of copper catalyst in major amount at a later stage is not as important when a pre-mixing stage is present as when it is absent. The catalyst ingredients most usually added incrementally are copper, bromide and secondary alkylene diamine. If incremental addition is employed, the following weight percentage amounts of these reagents are typically added in later stages:

Copper—5–25%, preferably 20–25%
Bromide—10–30%, preferably 25–30%
Diamine—20–50%, preferably 30–50%.

Per the process of the present invention the molecular weight of the polyphenylene oxide obtained can be controlled in simple fashion, with the primary process parameters which affect molecular weight being the ratio of catalyst to phenol, the percent monomer in the solution, the temperature and residence time in the reactors. The degree of agitation in the reactors and oxygen introduction rates are generally secondary parameters.

Reference is now made to the drawings in which

FIG. I is a schematic diagram of a continuous multi-zone limited back-mixing reactor useful in the second stage of the process of this invention, FIG. II is a cross-sectional view of one stage of said reactor along the line II—II of FIG. I, and FIG. III is a schematic diagram of a typical apparatus for carrying out the entire process of the invention.

Reactor 1 as shown in FIG. I has ten zones, one of which is designated as 2 and shown in cross-section in FIG. II. Oxygen is sparged via line 3, reaction solution is introduced via line 4 and product is withdrawn via line 5. Centered in each zone is a turbine agitator 6; all such agitators are driven by motor 7 via shaft 8. Each zone is provided with four equally spaced vertical baffles 9 and with a horizontal baffle 10, the latter comprising an outer section 11 attached to the inner wall of reaction 1 and an inner section 12 attached to shaft 8. Between them, outer section 11 and inner section 12 define an annular area 13 of limited back-mixing. Usually, annular area 13 comprises about 2–15%, most often about 4–8%, of the inner cross-sectional area of reactor 1.

In FIG. III, numeral 14 is the preferred copper catalyst pre-mix vessel, the same being provided with agitation means 15 and a nitrogen inlet 16 with feed of reaction components generally being indicated at A. The reaction components enumerated hereinabove are thoroughly agitated in catalyst pre-mixer 14 under a nitrogen blanket or other inert atmosphere. Any conventional agitation device may be used, a flat-bladed turbine impeller being suitable. Pressure is not important, the temperature is typically room temperature and the time of mixing is not overly important so long as dissolution of all components is achieved. Typically, mixing may be conducted for about 15 minutes.

The feed from catalyst pre-mixer 14 is conducted via line 17 to first CSTR 18, provided with agitation means 19 (similar to 15) and oxygen inlet 20. Cooling means for first CSTR 18, though not shown, will generally be provided. The output from first CSTR 18 is fed via line 21 to second CSTR 22, which is also provided with agitation means 23 (similar to 15) and oxygen inlet 24, as well as with cooling means which are likewise not shown. Line 4 conducts the output from second CSTR 22 to previously described multi-zone reactor 1.

The invention is illustrated by the following examples. All percentages are by weight of total solution unless otherwise indicated, and all mole amounts are per 1000 moles of 2,6-xylenol in the original feed solution. The following abbreviations are used:

DBEDA—N,N'-di-t-butylethylenediamine
DMBA—dimethyl-n-butylamine
DBA—di-n-butylamine.

Intrinsic viscosities were measured in chloroform at 25° C.

EXAMPLE 1

The apparatus consisted of a pre-mix vessel, a single CSTR, a centrifuge and a multi-zone reactor in series. The CSTR was an upright cylindrical tank 14 inches in diameter, agitated with a 5-inch diameter turbine agitator having six blades. The tank had a 10-gallon working volume and the agitator speed was 400 rpm. The CSTR was equipped with vertical baffles to prevent vortexing. Conventional internal cooling coils and external cooling jackets were used to remove the heat of reaction. The CSTR was maintained at 30° C. and ambient pressure with oxygen being introduced into the bottom thereof.

The multi-zone reactor was as shown in FIG. I. It had an internal diameter of 3 inches, was 30 inches long and contained 10 identical zones. With reference to FIG. II, inner section 12 had a diameter of 1.5 inches and annular area 13 had a width of 0.125 inch. The diameter of each turbine agitator 6 was 1.5 inches; each such agitator had 6 flat blades mounted on shaft 8 and was located midway between the top and bottom of its zone. Four vertical baffles 9, each 0.25 inch wide, were equally spaced around the circumference of the vessel. The turbines were rotated at 550 rpm. and the multi-zone reactor was operated at slightly above ambient pressure (typically 0–5 psig.). The multi-zone reactor was cooled or heated as necessary by means of a water jacket.

A feed solution in toluene as solvent was prepared by mixing the ingredients thereof in the pre-mix vessel under nitrogen for 15 minutes. Said feed solution contained 22% 2,6-xylenol, 0.022% Adogen 464 and the following proportions of other reagents:

| Reagent | Moles |
|---------|-------|
| DBEDA   | 1.1   |
| DMBA    | 44    |
| DBA     | 9.4   |
| Cu      | 1.7   |
| HBr     | 6.9   |

Copper and bromide were provided in the form of a $Cu_2O$ solution in 48% aqueous HBr.

The feed solution was continuously pumped into the CSTR and liquid was continuously withdrawn such that a constant liquid volume was maintained and the average liquid residence time in the CSTR was 33 minutes. Oxygen was fed into the CSTR at a rate of 60 SCFH.

The feed from the CSTR was centrifuged to remove the water of reaction. To the organic solution, under nitrogen, were added the following additional proportions of reagents:

| Reagent | Moles |
|---------|-------|
| DBEDA   | 1.0   |
| Cu      | 0.50  |
| HBr     | 2.7   |

The resulting solution was continuously fed through the multi-zone reactor at a rate such that the average liquid residence time therein was 20 minutes. Oxygen was fed to the multi-zone reactor at a rate of 1.5 SCFH. The multi-zone reactor was maintained at an average temperature of 40° C. with about a ±3° C. temperature variation along the length of the reactor.

The polyphenylene oxide product was isolated by diluting the solution thereof with one volume of toluene and then with approximately five volumes of methanol, filtering and drying in conventional manner.

EXAMPLES 2-3

The procedure of Example 1 was repeated, except that the oxygen feed rate to the multi-zone reactor was 2.0 SCFH and that different average liquid residence times were used therein.

The residence times and the intrinsic viscosities of the polyphenylene oxide products of Examples 1-3 are shown in the following table.

| Example | Average liquid residence time min. | Intrinsic viscosity, dl./g. |
| --- | --- | --- |
| 1 | 20 | 0.58 |
| 2 | 10 | 0.14 |
| 3 | 15 | 0.29 |

Examples 1-3 demonstrate that polyphenylene oxides of a wide variety of intrinsic viscosities (and thus a wide variety of molecular weights) can be continuously produced by the process of this invention.

EXAMPLE 4

The apparatus included a second CSTR following the first and excluded the water removal centrifuge. The second CSTR had a 16-gallon working volume and a 7-inch diameter turbine agitator with six blades and a speed of 370 rpm. The feed solution was identical to that of Example 1 except in the following respects:

| Reagent | Moles |
| --- | --- |
| DBEDA | 0.93 |
| HBr | 6.8 |

The feed solution was continuously pumped into the first CSTR which was maintained at 32° C., and liquid was continuously withdrawn such that a constant liquid volume was maintained and the average liquid residence time in the first CSTR was 20 minutes. Oxygen was fed into the first CSTR at a rate of 50 SCFH.

The product from the first CSTR was continuously pumped into the second CSTR which was maintained at 30° C., and liquid was continuously withdrawn such that a constant liquid volume was maintained and the average liquid residence time in the second CSTR was 32 minutes. Oxygen was fed into the second CSTR at a rate of 40 SCFH.

No attempt was made to separate water of reaction from the outlet streams from the first or second CSTR. To the outlet stream from the second CSTR was added, under nitrogen, 0.55 mole of DBEDA. The resulting solution was continuously fed through the multi-zone reactor at a rate such that the average liquid residence time therein was 10 minutes. Oxygen was fed to the multi-zone reactor at a rate of 2.0 SCFH. The multi-zone reactor temperature was maintained at about 36° C.±4° C. along the length of the reactor. The polyphenylene oxide product had an intrinsic viscosity of 0.51 dl./g.

EXAMPLE 5

The apparatus was identical to that of Example 1, and the feed solution differed only in the presence of 6.7 moles of HBr. The temperature and average liquid residence time in the CSTR were 36° C. and 59 minutes, respectively. The oxygen feed rate to the CSTR was 30 SCFH. The same proportions of ingredients as in Example 1 were added to the centrifuged product from the CSTR. The average liquid residence time in the multi-zone reactor was 10 minutes. The oxygen feed rate thereto was 2.0 SCFH and the temperature thereof was 40° C.±3° C. The polyphenylene oxide product had an intrinsic viscosity of greater than 0.71 dl./g.

The only significant difference between Examples 2 and 5 is that different liquid residence times in the first CSTR were used. This demonstrates that polyphenylene oxides of different intrinsic viscosities can be produced by changing only the residence time in the CSTR.

EXAMPLES 6-7

These examples demonstrate that the process of this invention can be operated at substantially different monomer concentrations and catalyst to monomer ratios than shown in the previous examples. Comparison between Examples 6 and 7 demonstrates that the catalyst level can be used in this process as a means of producing polyphenylene oxides of different intrinsic viscosities.

The apparatus of Example 1 was used. The feed solution contained 11% 2,6-xylenol, 0.022% Adogen 464 and the following proportions of other reagents:

| Reagent | Moles |
| --- | --- |
| DBEDA | 2.2 |
| DMBA | 89 |
| DBA | 19 |
| Cu | 3.3 |
| HBr | 13.3 |

The average liquid residence time and temperature in the CSTR were 30 minutes and 22° C., respectively. The oxygen feed rate to the CSTR was 60 SCFH.

The reagents added to the centrifuged product from the CSTR were as follows:

| Reagent | Moles Example 6 | Moles Example 7 |
| --- | --- | --- |
| DBEDA | 1.1 | 0.57 |
| Cu | 0.97 | 0.32 |
| HBr | 5.2 | 1.7 |

The oxygen feed rate of the multi-zone reactor was 2.0 SCFH in both examples, the temperature thereof was 42° C. ±3° C. and the average liquid residence time therein was 10 minutes. The polyphenylene oxide products had intrinsic viscosities of 0.61 dl./g. (Example 6) and 0.56 dl./g. (Example 7).

EXAMPLE 8

The apparatus consisted of a 1-liter CSTR 5.5 inches in diameter, equipped with four vertical baffles (to prevent vortexing), a six-blade agitator, an internal cooling coil and an oxygen sparging system.

A monomer solution was prepared by dissolving 36.8 grams of 50% aqueous sodium hydroxide in 200 ml. of methanol and adding this solution to a solution of 905 grams of 2,6-xylenol in 3790 ml. of toluene. A catalyst solution was also prepared, by dissolving 2.24 grams of manganese(II) chloride and 8.08 grams of benzoin oxime in 170 ml. of methanol.

A mixture of 980 ml. of monomer solution and 26 ml. of catalyst solution was charged to the reactor and oxygen was sparged into the mixture with stirring until steady state conditions were reached. Monomer and catalyst solutions were then introduced at 32.7 and 0.86 ml. per minute, respectively, and oxygen was sparged in at 1.8 SCFH. The temperature of the reaction mixture was maintained at 30° C. The resulting reaction mixture contained 20% 2,6-xylenol and the following concentrations of other ingredients:

| Reagent | Moles |
|---|---|
| Manganese(II) chloride | 1.8 |
| Benzoin oxime | 3.6 |
| Sodium hydroxide | 62 |

After the reaction had been run continuously at steady state for some time, an analysis of the polyphenylene oxide in the outlet stream showed an intrinsic viscosity of 0.10 dl./g. The feed and outlet streams were then stopped and the remaining reactor contents were reacted in batchwise fashion, with the same temperature and oxygen sparging rate. After 10 and 14 minutes of batch reaction, the polyphenylene oxide products (isolated by precipitation with methanol) had intrinsic viscosities of 0.39 and 0.76 dl./g., respectively.

EXAMPLE 9

The apparatus consisted of a CSTR similar to that of Example 8 but having a volume of 4.3 liters, in series with a multi-zone reactor similar to that of Example 1.

A monomer solution was prepared as described in Example 8 from 184 grams of 50% aqueous sodium hydroxide solution, 750 ml. of methanol, 4520 grams of 2,6-xylenol and 18.97 liters of toluene. A catalyst solution was also prepared from 10.3 grams of manganese(II) chloride, 37.0 grams of benzoin oxime and 825 ml. of methanol.

The CSTR was charged with 4170 ml. of monomer solution and 130 ml. of catalyst solution and brought to steady state at a temperature of 30° C. and an oxygen sparging rate of 3.3 SCFH. Addition of monomer and catalyst solutions was then begun at feed rates of 139 and 4.3 ml. per minute, respectively, for an average liquid residence time of 30 minutes. The reaction mixture contained 20% 2,6-xylenol and the following proportions of other reagents:

| Reagent | Moles |
|---|---|
| Manganese(II) chloride | 2.0 |
| Benzoin oxime | 4.0 |
| Sodium hydroxide | 62 |

The polymer in the effluent from the CSTR had an intrinsic viscosity of 0.13 dl./g.

The CSTR outlet stream was introduced into the top of the multi-zone reactor and oxygen was introduced to the bottom thereof at 2.0 SCFH. The average liquid residence time in the multi-zone reactor was 20 minutes, and the steady state temperature varied from 29° C. at the top to 40° C. at the bottom of the reactor. The polyphenylene oxide obtained was isolated as previously described. It had an intrinsic viscosity of 0.60 dl./g.

EXAMPLE 10

The procedure of Example 9 was repeated, except that the monomer solution also contained 10 moles of di-n-butylamine. The intrinsic viscosities of the polyphenylene oxides in the streams from the CSTR and the multi-zone reactor were 0.15 and 0.35 dl./g., respectively.

What is claimed is:

1. In a process for preparing polyphenylene oxides by the catalytic reaction of oxygen with at least one monohydroxyaromatic compound in solution in a solvent in which said polyphenylene oxide is also soluble, the improvement which comprises carrying out said reaction in two stages, the first stage being conducted continuously in at least one back-mixed reactor and the second stage in at least one batch reactor or continuously in a reaction system with limited back-mixing.

2. A process according to claim 1 wherein each back-mixed reactor is a tank reactor and the second stage is conducted continuously in a limited back-mixing reactor.

3. A process according to claim 2 wherein the first stage takes place in one or two continuous-flow stirred tank reactors and the reaction temperature in each of said tank reactors is in the range of about 10°–60° C.

4. A process according to claim 3 wherein at least about 65% conversion is achieved in the first tank reactor.

5. A process according to claim 3 wherein the second stage is effected in a continuous-flow tubular reactor.

6. A process according to claim 5 wherein the continuous-flow tubular reactor contains multiple reaction zones, each of which is agitated.

7. A process according to claim 6 wherein the continuous-flow tubular reactor contains at least five zones.

8. A process according to claim 7 wherein the reaction temperature in the continuous-flow tubular reactor is about 20°–60° C.

9. A process according to claim 8 wherein the monohydroxyaromatic compound is 2,6-xylenol.

10. A process according to claim 7 wherein the reaction is conducted in an alkaline system in the presence of a manganese complex catalyst.

11. A process according to claim 7 wherein the reaction is conducted in the presence of a catalyst comprising a combination of copper ions, halide ions and at least one amine.

12. A process according to claim 11 wherein water is removed from the reaction mixture after one or both tank reactors.

13. A process according to claim 12 wherein only one tank reactor is used.

14. A process according to claim 13 wherein two tank reactors are used and the weight average molecular weight of the product is increased at least fivefold in the second tank reactor.

15. A process according to claim 14 wherein the monohydroxyaromatic compound is 2,6-xylenol.

16. A process according to claim 3 wherein the reaction is conducted in the presence of a catalyst comprising copper ions, at least one secondary alkylene diamine and at least one tertiary monoamine.

17. A process according to claim 16 wherein the secondary alkylene diamine is N,N'-di-t-butylethylenediamine and the tertiary monoamine is dimethyl-n-butylamine.

18. A process according to claim 17 wherein the catalyst additionally contains at last one secondary monoamine.

19. A process according to claim 18 wherein the secondary alkylene diamine is N,N'-di-t-butylethylenediamine, the tertiary monoamine is dimethyl-n-butylamine and the secondary monoamine is dimethylamine or di-n-butylamine.

20. A process according to claim 19 wherein the reaction mixture also contains a phase transfer catalyst.

21. A process according to claim 20 wherein the monohydroxyaromatic compound is 2,6-xylenol.

22. A process according to claim 10 wherein the catalyst additionally contains at least one secondary monoamine.

23. A process according to claim 22 wherein the manganese complex is a benzoin oxime complex.

24. A process according to claim 3 wherein the reaction is conducted in the presence of a catalyst comprising a combination of copper ions, halide ions and at least one amine, and the non-gaseous constituents are premixed in an inert atmosphere to form a homogeneous mixture which is fed to the first stage.

* * * * *